(12) United States Patent
Sasayama et al.

(10) Patent No.: US 11,662,111 B2
(45) Date of Patent: May 30, 2023

(54) AIR-CONDITIONING SYSTEM WITH REFRIGERANT LEAK DETECTION AND COUNTERMEASURES

(71) Applicant: DAIKIN INDUSTRIES, LTD., Osaka (JP)

(72) Inventors: Hiroki Sasayama, Osaka (JP); Shuuichi Suzuki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/874,580

(22) Filed: Jul. 27, 2022

(65) Prior Publication Data
US 2022/0364750 A1 Nov. 17, 2022

Related U.S. Application Data

(63) Continuation of application No. PCT/JP2020/043188, filed on Nov. 19, 2020.

(30) Foreign Application Priority Data

Feb. 5, 2020 (JP) .............................. JP2020-018218

(51) Int. Cl.
*F24F 11/36* (2018.01)
*F24F 11/77* (2018.01)
(Continued)

(52) U.S. Cl.
CPC .............. *F24F 11/36* (2018.01); *F24F 7/007* (2013.01); *F24F 11/56* (2018.01); *F24F 11/77* (2018.01); *F24F 2110/65* (2018.01)

(58) Field of Classification Search
CPC .. F24F 11/36; F24F 7/007; F24F 11/56; F24F 11/77; F24F 2110/65
See application file for complete search history.

(56) References Cited

U.S. PATENT DOCUMENTS

2017/0198936 A1* 7/2017 Yamaguchi .............. F24F 11/74
2018/0045424 A1 2/2018 Yajima et al.

FOREIGN PATENT DOCUMENTS

GB 2554582 A 4/2018
JP 2015-197279 A 11/2015
(Continued)

OTHER PUBLICATIONS

International Search Report, issued in PCT/JP2020/043188, dated Dec. 22, 2020.
(Continued)

*Primary Examiner* — Henry T Crenshaw
(74) *Attorney, Agent, or Firm* — Birch, Stewart, Kolasch & Birch, LLP (57) ABSTRACT

An air-conditioning system includes: an air conditioner including a refrigerant circuit formed by connecting an outdoor unit and a plurality of indoor units together, the air conditioner being configured to condition air in a plurality of indoor spaces; at least one countermeasure device provided in correspondence with at least one of the plurality of indoor spaces and configured to operate during leakage of a refrigerant; a plurality of detectors configured to detect a concentration of the refrigerant, at least one of the detectors being provided in each of the plurality of indoor spaces; and a control unit configured to operate all of the at least one countermeasure device if at least one of the concentrations of the refrigerant respectively detected by the plurality of detectors exceeds a predetermined value.

4 Claims, 10 Drawing Sheets

(51) Int. Cl.
F24F 11/56 (2018.01)
F24F 7/007 (2006.01)
F24F 110/65 (2018.01)

(56) References Cited

FOREIGN PATENT DOCUMENTS

| | | | |
|---|---|---|---|
| JP | 2016-151395 A | | 8/2016 |
| JP | 2017-53509 A | | 3/2017 |
| JP | 2017-053509 | * | 12/2017 |
| JP | 2018-77040 A | | 5/2018 |
| JP | 2018-155461 A | | 10/2018 |
| JP | 2019-39567 A | | 3/2019 |
| WO | WO 2017/002216 A1 | | 1/2017 |

OTHER PUBLICATIONS

Written Opinion of the International Searching Authority, issued in PCT/JP2020/043188, dated Dec. 22, 2020.
International Preliminary Report on Patentability and Written Opinion of the International Searching Authority for International Application No. PCT/JP2020/043188, dated Aug. 18, 2022.

* cited by examiner

| ASHRAE Number | Component | Mass% | Alternative |
|---|---|---|---|
| R1234yf | R1234yf | (100) | R134a |
| R1234ze(E) | R1234ze(E) | (100) | R134a |
|  | R1234yf/R134a/R152a | (82/7/11) | R134a |
| R516A | R1234yf/R134a/R152a | (77.5/8.5/14.0) | R134a |
| R445A | R744/R134a/R1234ze(E) | (6.0/9.0/85.0) | R134a |
| R444A | R32/R152a/R1234ze(E) | (12/5/83) | R134a |
|  | R32/R125/R1234yf | (15/25/60) | R22/407 |
| R454C | R32/R1234yf | (21.5/78.5) | R22/407 |
|  | R32/R152a/R1234ze(E) | (45/20/35) | R22/407 |
| R444B | R32/R152a/R1234ze(E) | (41.5/48.5/10) | R22/407 |
|  | R744/R32/R1234ze(E) | (7/30/63) | R22/407 |
| R454A | R32/R1234yf | (35/65) | R404A |
| R454A | R32/R1234yf | (35/65) | R404A |
| R454C | R32/R1234yf | (21.5/78.5) | R404A |
|  | R32/R1234yf/R152a/R1234ze(E) | (40/20/10/30) | R404A |
| R455A | R744/R32/R1234yf | (3.0/21.5/75.5) | R404A |
|  | R32/R1234yf/R134a | (28/51/21) | R404A |
|  | R32/R1234yf/R152a | (35/55/10) | R404A |
|  | R32/R1234yf | (29/71) | R404A |
|  | R-32/R290/R1234yf | (21.0/7.9/71.1) | R404A |
| R457A | R32/R1234yf/R152a | (18/70/12) | R404A |
| R459B | R32/R1234yf/R1234ze(E) | (21/69/10) | R404A |
|  | R32/R134a | (50/50) | R404A |
|  | R32/R1234yf | (40/60) | R410A |
| R452B | R32/R125/R1234yf | (67/7/26) | R410A |
|  | R32/R1234yf | (72.5/27.5) | R410A |
| R454B | R32/R1234yf | (68.9/31.1) | R410A |
|  | R32/R125/R1234ze(E) | (68/15/17) | R410A |
| R447B | R32/R125/R1234ze(E) | (68/8/24) | R410A |
| R32 | R32 | (100) | R410A |
| R447A | R32/R1234ze(E)/R125 | (68/28.5/3.5) | R410A |
|  | R32/R1234yf/R1234ze(E) | (73/15/12) | R410A |
|  | R32/R1234ze(E) | (72/27) | R410A |
| R446A | R32/R1234ze(E)/Butane | (68/29/3) | R410A |
|  | R32/R1234yf/R134a | (50/40/10) | R410A |
| R459A | R32/R1234yf/R1234ze(E) | (68/26/6) | R410A |
|  | R1123/R32 | (32/68) | R410A |
|  | R1123/R32 | (40/60) | R410A |
|  | R1123/R32 | (45/55) | R410A |
|  | R1123/R32/R1234yf | (19/55/26) | R410A |
|  | R1123/R32/R1234yf | (40/44/16) | R410A |
|  | R1123 | (100) | R410A |
|  | R744/R32/R1234ze(E) | (6/60/34) | R410A |
|  | R32/R134a/R1234ze | (76/6/18) | R410A |
|  | R32/R152a | (95/5) | R410A |
|  | R32/R134a | (95/5) | R410A |

AIR-CONDITIONING SYSTEM WITH REFRIGERANT LEAK DETECTION AND COUNTERMEASURES

CROSS REFERENCE TO RELATED APPLICATIONS

This application is a Continuation of PCT International Application No. PCT/JP2020/043188, filed on Nov. 19, 2020, which claims priority under 35 U.S.C. 119(a) to Patent Application No. 2020-018218, filed in Japan on Feb. 05, 2020, all of which are hereby expressly incorporated by reference into the present application.

TECHNICAL FIELD

The present disclosure relates to an air-conditioning system including an air conditioner.

BACKGROUND ART

Patent Document 1 discloses an air conditioner including ventilators configured to ventilate a target space to be air-conditioned and refrigerant leakage detectors configured to detect a refrigerant. One of the refrigerant leakage detectors of the air conditioner detecting a refrigerant causes the ventilator assigned to the group corresponding to the one of the refrigerant leakage detectors to perform a refrigerant discharge operation.

To achieve the refrigerant discharge operation, signal transmission systems between devices including the refrigerant leakage detectors need to be reliably connected together. To satisfy the need, if a situation where the signal transmission systems between the devices are not reliably connected together at the installation site occurs (in other words, if no signals from the refrigerant leakage detectors or from the ventilators are input to a controller of the air conditioner), the controller prohibits operation including trial operations of indoor units and an outdoor unit.

CITATION LIST

Patent Documents

Patent Document 1: Japanese Unexamined Patent Publication No. 2016-151395

SUMMARY

A first aspect is directed to an air-conditioning system including: an air conditioner (10) including a refrigerant circuit (10a) formed by connecting an outdoor unit (20) and a plurality of indoor units (30) together, the air conditioner (10) being configured to condition air in a plurality of indoor spaces (A); at least one countermeasure device (V, 65) provided in correspondence with at least one of the plurality of indoor spaces (A) and configured to operate during leakage of a refrigerant; a plurality of detectors (70) configured to detect a concentration of the refrigerant, at least one of the detectors (70) being provided in each of the plurality of indoor spaces (A); and a control unit (81) configured to operate all of the at least one countermeasure device (V, 65) if at least one of the concentrations of the refrigerant respectively detected by the plurality of detectors (70) exceeds a predetermined value.

BRIEF DESCRIPTION OF THE DRAWINGS

FIG. 12 is a table showing refrigerants used in a refrigerant circuit of an air conditioner.

DESCRIPTION OF EMBODIMENTS

Embodiments will now be described in detail with reference to the drawings. Note that the same reference characters denote the same or equivalent components in the drawings, and the description thereof will not be repeated.

<General Configuration of Air Conditioner>

Figure 1:
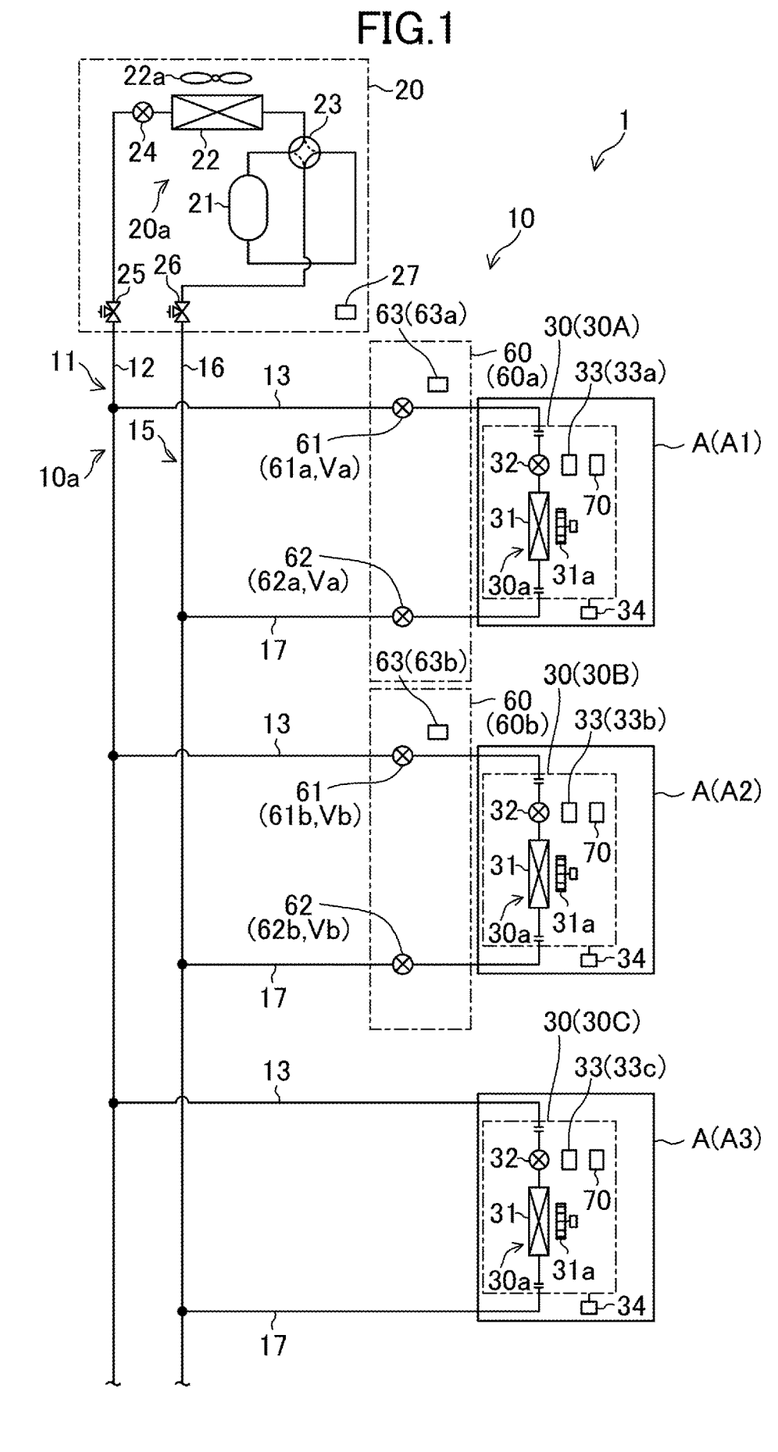
FIG. 1 is a piping system diagram showing a schematic configuration of an air-conditioning system according to an embodiment.

An air-conditioning system (1) of this embodiment includes an air conditioner (10). The air conditioner (10) conditions air in a plurality of indoor spaces (A). The plurality of indoor spaces (A) include indoor spaces (A1, A2, A3). As shown in FIG. 1, the air conditioner (10) of this example is configured as a multi-split air conditioner and includes an outdoor unit (20) and a plurality of indoor units (30). The plurality of indoor units (30) include indoor units (30A, 30B, 30C). The indoor unit (30A) is provided in the indoor space (A1). The indoor unit (30B) is provided in the indoor space (A2). The indoor unit (30C) is provided in the indoor space (A3). An indoor unit (30) provided in an indoor space (A) may be hereinafter referred to as an "indoor unit (30A)," an indoor unit (30) provided in an indoor space (B) as an "indoor unit (30B)," and an indoor unit (30) provided in an indoor space (C) as an "indoor unit (30C)." The indoor units (30A, 30B, 30C) have the same configuration. Thus, if these indoor units (30A, 30B, 30C) do not need to be described separately, these indoor units (30A, 30B, 30C) will be referred to as the "indoor units (30)." The air conditioner (10) of this example switches between cooling and heating of air in a target space. The number of the indoor units (30) is three in FIG. 1, but merely needs to be two or more.

The outdoor unit (20) is placed outside. In the air conditioner (10), the outdoor unit (20) is connected to the indoor units (30) via connection pipes (11, 15).

The air conditioner (10) includes a refrigerant circuit (10a) through which a refrigerant circulates to perform a vapor compression refrigeration cycle. The refrigerant circuit (10a) includes an outdoor circuit (20a) provided in the outdoor unit (20) and three indoor circuits (30a) provided in the respective indoor units (30). In the refrigerant circuit (10a), the three indoor circuits (30a) are connected together in parallel. The outdoor circuit (20a) is connected to the three indoor circuits (30a) via the connection pipes (11, 15). In other words, the refrigerant circuit (10a) includes the outdoor unit (20) and the three indoor units (30) connected together.

<Connection Pipe>

The connection pipes include a liquid connection pipe (11) and a gas connection pipe (15).

The liquid connection pipe (11) includes a main liquid pipe (12) and a plurality of liquid branch pipes (13). The liquid branch pipes (13) correspond to first refrigerant flow paths. One end of the main liquid pipe (12) is connected to a liquid stop valve (25) of the outdoor circuit (20a). One ends of the liquid branch pipes (13) are connected to the main liquid pipe (12). The other ends of the liquid branch pipes (13) are connected to the respective liquid ends (liquid-side joints) of the indoor circuits (30a).

The gas connection pipe (15) includes a main gas pipe (16) and a plurality of gas branch pipes (17). The gas branch pipes (17) correspond to second refrigerant flow paths. One end of the main gas pipe (16) is connected to a gas stop valve (26) of the outdoor circuit (20a). One ends of the gas branch pipes (17) are connected to the main gas pipe (16). The other ends of the gas branch pipes (17) are connected to the respective gas ends (gas-side joints) of the indoor circuits (30a).

<Outdoor Unit>

As shown in FIG. 1, the air conditioner (10) includes one outdoor unit (20). The outdoor unit (20) includes a casing (not shown) that houses the outdoor circuit (20a). The outdoor circuit (20a) connects a compressor (21), an outdoor heat exchanger (22), a four-way switching valve (23), an outdoor expansion valve (24), the gas stop valve (26), and the liquid stop valve (25). The compressor (21) compresses a refrigerant sucked thereinto and discharges the compressed refrigerant. The outdoor heat exchanger (22) exchanges heat between the refrigerant and outdoor air. An outdoor fan (22a) is provided adjacent to the outdoor heat exchanger (22). The outdoor fan (22a) transfers the outdoor air passing through the outdoor heat exchanger (22).

The four-way switching valve (23) switches between a first state indicated by solid lines in FIG. 1 and a second state indicated by broken lines in FIG. 1. The four-way switching valve (23) in the first state makes a discharge side of the compressor (21) and a gas end of the outdoor heat exchanger (22) communicate with each other, and makes a suction side of the compressor (21) and the gas stop valve (26) communicate with each other. The four-way switching valve (23) in the second state makes the discharge side of the compressor (21) and the gas stop valve (26) communicate with each other, and makes the suction side of the compressor (21) and the gas end of the outdoor heat exchanger (22) communicate with each other.

The outdoor expansion valve (24) is connected between the outdoor heat exchanger (22) and the liquid stop valve (25), in the outdoor circuit (20a). The outdoor expansion valve (24) is configured as an electronic expansion valve having an adjustable opening degree.

The outdoor unit (20) is provided with an outdoor controller (27). The outdoor controller (27) controls components including the compressor (21), the outdoor expansion valve (24), and the outdoor fan (22a), in the outdoor unit (20). The outdoor controller (27) includes a microcomputer mounted on a control board, and a memory device (specifically, a semiconductor memory) storing software for operating the microcomputer. The outdoor controller (27) will be described in detail later. The outdoor controller (27) corresponds to a relay control unit.

<Indoor Unit>

As shown in FIG. 1, the air conditioner (10) includes three indoor units (30). The indoor units (30) are of a ceiling-mounted type. The ceiling-mounted type as used herein includes a ceiling embedded type and a ceiling-suspended type. The indoor units (30) each include a casing (not shown) that houses the associated one of the indoor circuits (30a). The indoor circuit (30a) connects an indoor heat exchanger (31) and an indoor expansion valve (32). The indoor heat exchanger (31) exchanges heat between the refrigerant and indoor air. An indoor fan (31a) is provided adjacent to the indoor heat exchanger (31). The indoor fan (31a) transfers the indoor air passing through the indoor heat exchanger (31).

The indoor expansion valve (32) is connected between the liquid-side joint and the indoor heat exchanger (31) in the indoor circuit (30a). The indoor expansion valve (32) is configured as an electronic expansion valve having an adjustable opening degree.

The indoor units (30) are each provided with an indoor controller (33). The indoor controller (33) controls components including the indoor expansion valve (32) and the indoor fan (31a), in the indoor unit (30). The indoor controller (33) includes a microcomputer mounted on a control board, and a memory device (specifically, a semiconductor memory) storing software for operating the microcomputer. The indoor controller (33) will be described in detail later. In the following description, the indoor controller (33) of the indoor unit (30A) is referred to as the "indoor controller (33a)," the indoor controller (33) of the indoor unit (30B) as the "indoor controller (33b)," and the indoor controller (33) of the indoor unit (30C) as the "indoor controller (33c)." The indoor controllers (33a, 33b, 33c) have the same configuration. Thus, if these indoor controllers (33a, 33b, 33c) do not need to be described separately, these indoor controllers (33a, 33b, 33c) will be referred to as the "indoor controllers (33)."

The indoor units (30) are each connected to a remote control (34). The remote control (34) is operated to switch the operating mode and the set temperature of the associated one of the indoor units (30).

<Cut-Off Unit>

The air conditioner (10) includes a plurality of cut-off units (60). The plurality of cut-off units (60) include cut-off units (60a, 60b). The cut-off units (60) are provided in one-to-one correspondence with the indoor circuits (30a) of the indoor units (30A) and (30B). In other words, the cut-off units (60) are each provided in correspondence with the liquid branch pipe (13) and the gas branch pipe (17) forming a pair. The cut-off units (60) each block the flows of the refrigerant through the associated liquid branch pipe (13) and the associated gas branch pipe (17) when the refrigerant has leaked in the associated one of the indoor circuits (30a). The cut-off unit (60) corresponding to the indoor unit (30A) may be hereinafter referred to as the "cut-off unit (60a)," and the cut-off unit (60) corresponding to the indoor unit (30B) as the "cut-off unit (60b)." The cut-off units (60a, 60b) have the same configuration. Thus, if these cut-off units (60a, 60b) do not need to be described separately, these cut-off units (60a, 60b) will be referred to as the "cut-off units (60)." Note that the indoor unit (30C) is not provided with a cut-off unit (60). The number of the cut-off units (60) is two in FIG. 1, but merely needs to be one or more.

Each cut-off unit (60) includes a first cut-off valve (61) and a second cut-off valve (62). The first cut-off valve (61) is connected to the liquid branch pipe (13). The second cut-off valve (62) is connected to the gas branch pipe (17). The first cut-off valve (61) constitutes a cut-off valve (V) that blocks the flow of the refrigerant through the liquid branch pipe (13). The second cut-off valve (62) constitutes a cut-off valve (V) that blocks the flow of the refrigerant through the gas branch pipe (17). The first cut-off valve (61) and the second cut-off valve (62) are disposed outside the casing of the indoor unit (30). Since the indoor units (30) are of the ceiling mounted type, the first cut-off valve (61) and the second cut-off valve (62) are disposed in the ceiling cavity.

The cut-off units (60) are each provided with a valve controller (63). The valve controller (63) controls components including the first and second cut-off valves (61) and (62), in the cut-off unit (60). The valve controller (63) includes a microcomputer mounted on a control board, and a memory device (specifically, a semiconductor memory) storing software for operating the microcomputer. The valve controller (63) will be described in detail later. The outdoor controller (27), the indoor controllers (33), and the valve controllers (63) form a control unit (81). The first cut-off valve (61), the second cut-off valve (62), the valve controller (63), and the cut-off valves (V) of the cut-off unit (60a) may be hereinafter referred to as the "first cut-off valve (61a)," the "second cut-off valve (62a)," the "valve controller (63a)," and the "cut-off valves (Va)," respectively. The first cut-off valve (61), the second cut-off valve (62), the valve controller (63), and the cut-off valves (V) of the cut-off unit (60b) may be referred to as the "first cut-off valve (61b)," the "second cut-off valve (62b)," the "valve controller (63b)," and the "cut-off valves (Vb)," respectively.

<Sensor>

The air conditioner (10) includes sensors (70). The sensors (70) are provided in the respective indoor units (30). The sensors (70) are each disposed inside the casing of the associated one of the indoor units (30). The sensors (70) each detect the leakage of the refrigerant in the indoor circuit (30a) of the associated one of the indoor units (30). The sensors (70) may each be disposed outside the casing of the indoor unit (30).

The sensors (70) are configured as, for example, semiconductor elements. Each sensor (70) detects the concentration of the refrigerant that has leaked from the associated one of the indoor circuits (30a). The sensor (70) outputs a voltage value corresponding to the detected concentration of the refrigerant to the indoor controller (33).

Figure 2:
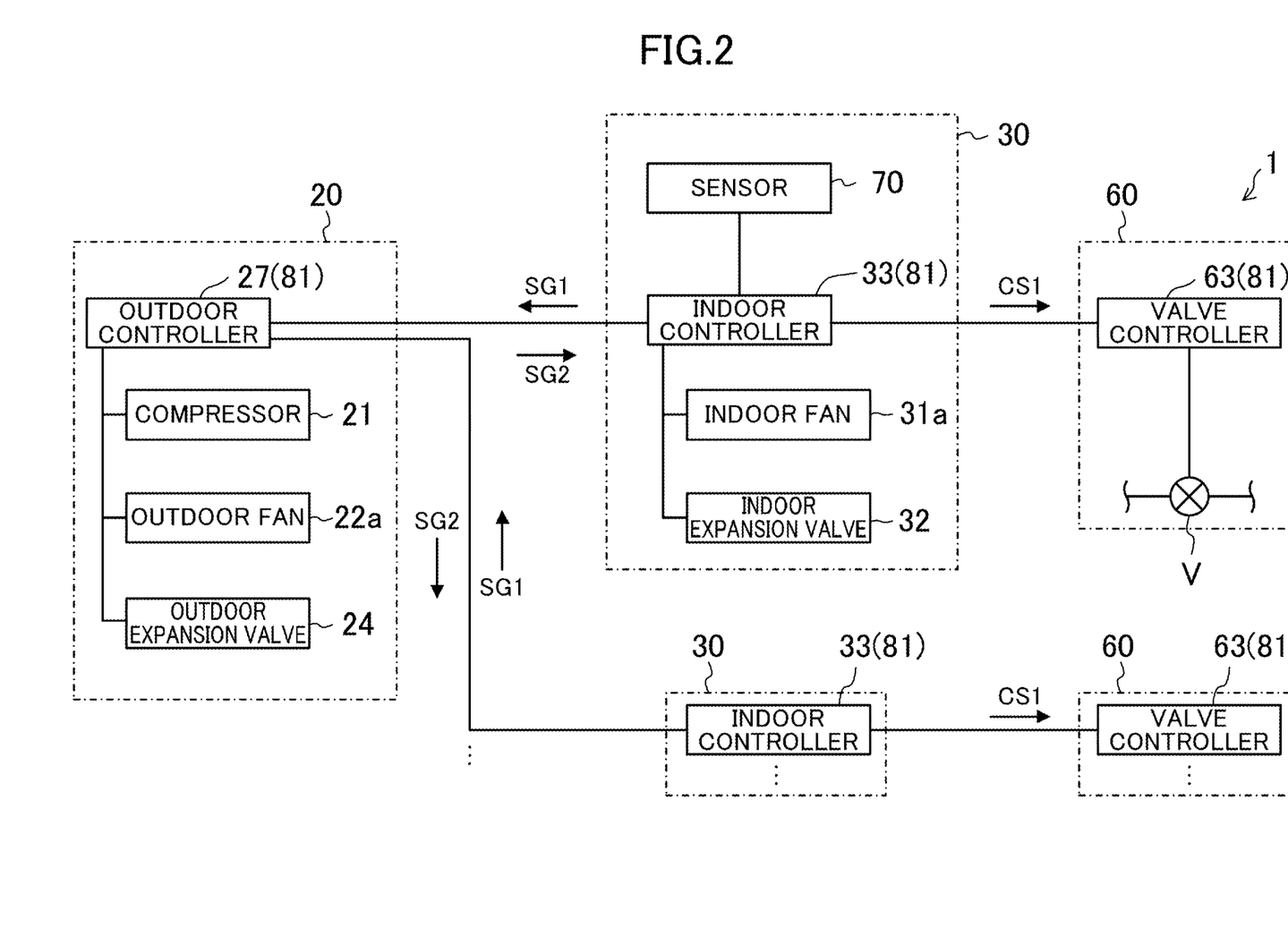
FIG. 2 is a block diagram illustrating a configuration of the air-conditioning system according to the embodiment.

<Indoor Controller>

The indoor controllers (33) are connected to the outdoor controller (27) of the outdoor unit (20) by communication lines. The indoor controllers (33) communicate with the outdoor controller (27) via the communication lines.

Each indoor controller (33) determines whether the voltage value received from the sensor (70) has exceeded a predetermined value. The sensor (70) constitutes a detector.

Each indoor controller (33), when determining that the voltage value received from the sensor (70) has exceeded the predetermined value, transmits a first signal (SG1) to the outdoor controller (27). In other words, the indoor controller (33) transmits the first signal (SG1) to the outdoor controller (27) if the associated sensor (70) detects leakage of the refrigerant.

The indoor controller (33) is connected to the valve controller (63) of the associated cut-off unit (60) by communication lines. The indoor controller (33) communicates with the associated valve controller (63) via the communication lines. The indoor controller (33) transmits a signal that controls the open/close status of each of the first and second cut-off valves (61) and (62) to the valve controller (63) in response to a signal received from the outdoor controller (27) and the voltage value received from the sensor (70).

Specifically, each indoor controller (33), when determining that the voltage value received from the sensor (70) has exceeded the predetermined value, transmits a valve closing signal (CS1) to the valve controller (63). The indoor controller (33), when receiving a second signal (SG2) to be described later from the outdoor controller (27), transmits the valve closing signal (CS1) to the valve controller (63).

<Outdoor Controller>

The outdoor controller (27) is connected to the indoor controllers (33) of the plurality of indoor units (30) by communication lines. The outdoor controller (27) communicates with the plurality of indoor controllers (33) via the communication lines. The outdoor controller (27), when receiving the first signal (SG1) from at least one of the plurality of indoor controllers (33), transmits the second signal (SG2) to each of the indoor controllers (33).

<Valve Controller>

The valve controller (63) controls the open/close status of each of the first and second cut-off valves (61) and (62) in accordance with a signal received from the indoor controller (33). Specifically, the valve controller (63) that receives the valve closing signal (CS1) from the indoor controller (33) controls the first and second cut-off valves (61) and (62) such that the first and second cut-off valves (61) and (62) are closed. In other words, the cut-off unit (60) operates during leakage of the refrigerant.

—Operation—

The air conditioner (10) performs a cooling operation and a heating operation. Hereinafter, the cooling operation and the heating operation during a normal operation in which the refrigerant has not leaked will be described with reference to FIG. 1.

<Cooling Operation>

During the cooling operation, the four-way switching valve (23) is in the first state, and the first cut-off valves (61) and the second cut-off valves (62) are in the open state. The outdoor expansion valve (24) is open. The opening degree of the indoor expansion valve (32) is controlled based on the degree of superheat of the associated one of the indoor heat exchangers (31). The outdoor fan (22a) and the indoor fans (31a) are actuated. During the cooling operation, performed is a cooling cycle in which the refrigerant dissipates heat and is condensed in the outdoor heat exchanger (22), and the refrigerant evaporates in the indoor heat exchangers (31).

The refrigerant compressed in the compressor (21) dissipates heat, is condensed in the outdoor heat exchanger (22), and passes through the outdoor expansion valve (24). This refrigerant flows from the main liquid pipe (12) into the liquid branch pipe (13), flows through the first cut-off valve (61), and flows into the associated one of the indoor circuits (30a). In the indoor circuit (30a), the refrigerant is decompressed at the indoor expansion valve (32), and then evaporates in the indoor heat exchanger (31). In the indoor heat exchanger (31), the air is cooled by the evaporating refrigerant. The cooled air is supplied to the indoor space.

The refrigerant that has evaporated in the indoor heat exchanger (31) flows through the gas branch pipe (17), and flows through the second cut-off valve (62). The flows of the refrigerant merge together in the main gas pipe (16) to be sucked into the compressor (21).

<Heating Operation>

During the heating operation, the four-way switching valve (23) is in the second state, and the first cut-off valves (61) and the second cut-off valves (62) are in the open state. The opening degree of the outdoor expansion valve (24) is controlled based on the degree of superheat of the refrigerant flowing out of the outdoor heat exchanger (22). The opening degree of the indoor expansion valve (32) is controlled based on the degree of subcooling of the refrigerant flowing out of the indoor heat exchanger (31). The outdoor fan (22a) and the indoor fans (31a) are actuated. During the heating operation, performed is a heating cycle in which the refrigerant dissipates heat and is condensed in the indoor heat exchangers (31), and the refrigerant evaporates in the outdoor heat exchanger (22).

The refrigerant that has been compressed in the compressor (21) flows from the main gas pipe (16) into the gas branch pipe (17), flows through the second cut-off valve (62), and flows into the associated one of the indoor circuits (30a). In the indoor circuit (30a), the refrigerant dissipates heat and is condensed in the indoor heat exchanger (31). In the indoor heat exchanger (31), the air is heated by the refrigerant dissipating heat. The heated air is supplied to the indoor space.

The refrigerant that has dissipated heat in the indoor heat exchanger (31) flows through the liquid branch pipe (13), and flows through the first cut-off valve (61). The flows of refrigerant merge in the main liquid pipe (12) to be decompressed in the outdoor expansion valve (24). The decompressed refrigerant flows through the outdoor heat exchanger (22). In the outdoor heat exchanger (22), the refrigerant absorbs heat from the outdoor air to evaporate. The evaporated refrigerant is sucked into the compressor (21).

—Operation of Cut-Off Valve During Refrigerant Leakage—

The first cut-off valves (61) and the second cut-off valves (62) of this example are configured to be kept in the above-mentioned open state during the normal operation. This makes the liquid branch pipe (13), the indoor circuit (30a), and the gas branch pipe (17) communicate with one another, and the cooling and heating operations described above can be performed.

When the refrigerant leaks in the indoor circuit (30a) of the indoor unit (30) during the cooling operation or the heating operation, the first cut-off valves (61) and the second cut-off valves (62) are placed in the closed state. This operation blocks the liquid branch pipe (13) and the gas branch pipe (17). As a result, the leakage of the refrigerant in the outdoor circuit (20a), the main liquid pipe (12), and the main gas pipe (16) from the indoor circuit (30a) to the indoor space or any other space may be avoided, immediately.

—Operation of Air Conditioner—

Next, the flow of operations of the air-conditioning system (1) during leakage of the refrigerant will be described in detail with reference to FIGS. 3 to 6.

Each indoor controller (33) executes a first process and a second process. In the first process, if the refrigerant leaks from the indoor circuit (30a) of one of the indoor units (30) including the indoor controller (33), the indoor controller (33) transmits a signal for closing the associated cut-off valves (V). In the second process, if the refrigerant leaks from the indoor circuit (30a) of another one of the indoor units (30), the indoor controller (33) receives the second signal (SG2) from the outdoor controller (27), and transmits a signal for closing the associated cut-off valves (V).

Figure 3:
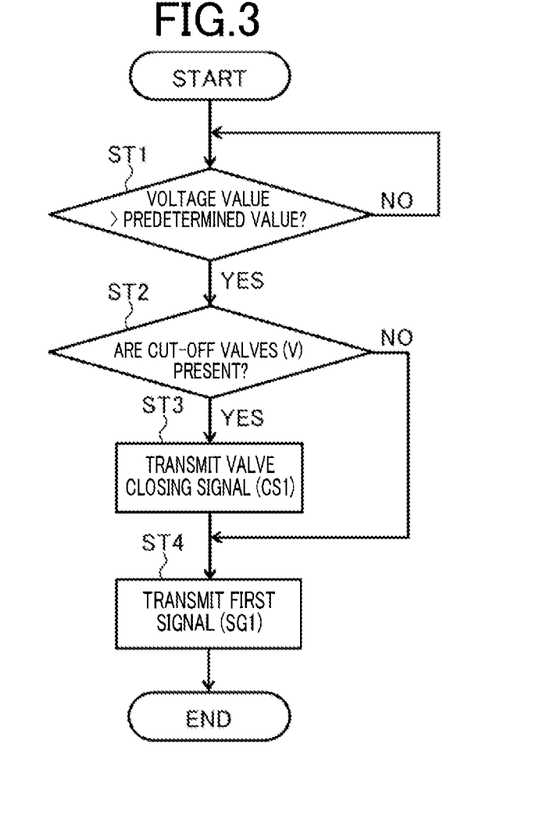
FIG. 3 is a flowchart for explaining operations performed by an indoor controller in a first process according to the embodiment.

The first process to be performed by the indoor controllers (33) will be described with reference to FIG. 3. A case where the refrigerant leaks in the indoor unit (30A) for the indoor space (A1) will now be described.

In Step (ST1), the indoor controller (33a) determines whether the concentration of the refrigerant has exceeded a predetermined value. Specifically, the indoor controller (33a) determines whether the voltage value corresponding to the concentration of the refrigerant received from the sensor (70) has exceeded a predetermined value. If the indoor controller (33a) determines that the voltage value has exceeded the predetermined value, Step (ST2) is performed. If the indoor controller (33a) determines that the voltage value does not exceed the predetermined value, the process returns to Step (ST1).

In Step (ST2), the indoor controller (33a) determines whether or not the valve controller (63a) capable of communicating is present. Specifically, each indoor controller (33) determines whether or not the valve controller (63) capable of communicating is present, based on data stored in the semiconductor memory. For example, the indoor controller (33) that has established communication with the associated one of the valve controllers (63) stores, in its semiconductor memory, that the valve controller (63) capable of communicating is present. In contrast, the indoor controller (33) that does not establish communication with the associated one of the valve controllers (63) stores, in its semiconductor memory, that no valve controller (63) capable of communicating is present. If the indoor controller (33) determines that the valve controller (63) capable of communicating is present, Step (ST3) is performed. If the indoor controller (33) determines that no valve controller (33) capable of communicating is present, Step (ST3) is skipped, and Step (ST4) is performed. In the configuration of FIG. 1, the valve controller (63a) capable of communicating with the indoor controller (33a) is present. Thus, Step (ST3) and Step (ST4) are performed.

In Step (ST3), the indoor controller (33a) transmits the valve closing signal (CS1) to the associated valve controller (63a).

In Step (ST4), the indoor controller (33a) transmits the first signal (SG1) to the outdoor controller (27). The first process to be performed by the indoor controllers (33) is terminated here.

Figure 4:
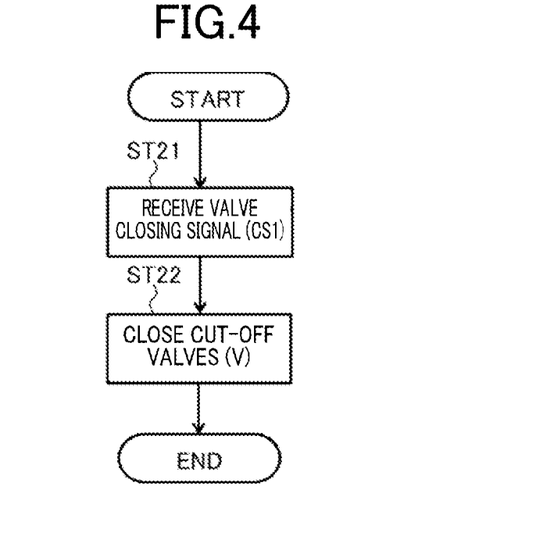
FIG. 4 is a flowchart for explaining operations performed by a valve controller according to the embodiment.

Next, operation of each valve controller (63) will be described with reference to FIG. 4.

In Step (ST21), the valve controller (63a) receives the valve closing signal (CS1) transmitted by the indoor controller (33a) in Step (ST3). In Step (ST22), the valve controller (63a) closes the cut-off valves (Va). In other words, the valve controller (63a), when receiving the valve closing signal (CS1), places the first and second cut-off valves (61a) and (62a) in the closed state. This blocks the liquid branch pipe (13) and the gas branch pipe (17), thus separating the indoor circuit (30a) of the indoor unit (30A) from the refrigerant circuit (10a).

Figure 5:
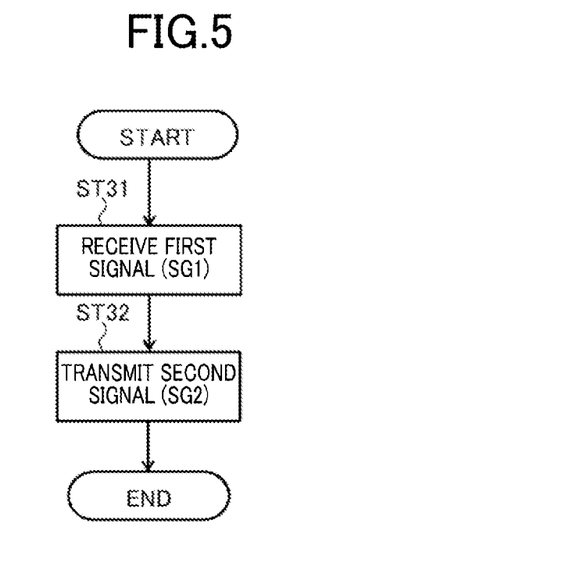
FIG. 5 is a flowchart for explaining operations performed by an outdoor controller according to the embodiment.

Next, operation of the outdoor controller (27) will be described with reference to FIG. 5.

In Step (ST31), the outdoor controller (27) receives the first signal (SG1) transmitted by the indoor controller (33a)

in Step (ST4). In Step (ST32), the outdoor controller (27) transmits the second signal (SG2) to all of the indoor controllers (33) except the indoor controller (33a). In the configuration of FIG. 1, the outdoor controller (27) transmits the second signal (SG2) to each of the indoor controllers (33b, 33c). In Step (ST32), the outdoor controller (27) may transmit the second signal (SG2) to all of the indoor controllers (33) including the indoor controller (33a), or may transmit the second signal (SG2) to at least one of the indoor controllers (33) capable of communicating with the associated one of the valve controllers (63). For example, in the configuration of FIG. 1, the outdoor controller (27) merely needs to transmit the second signal (SG2) to the indoor controller (33b) capable of communicating with the valve controller (63b).

Figure 6:
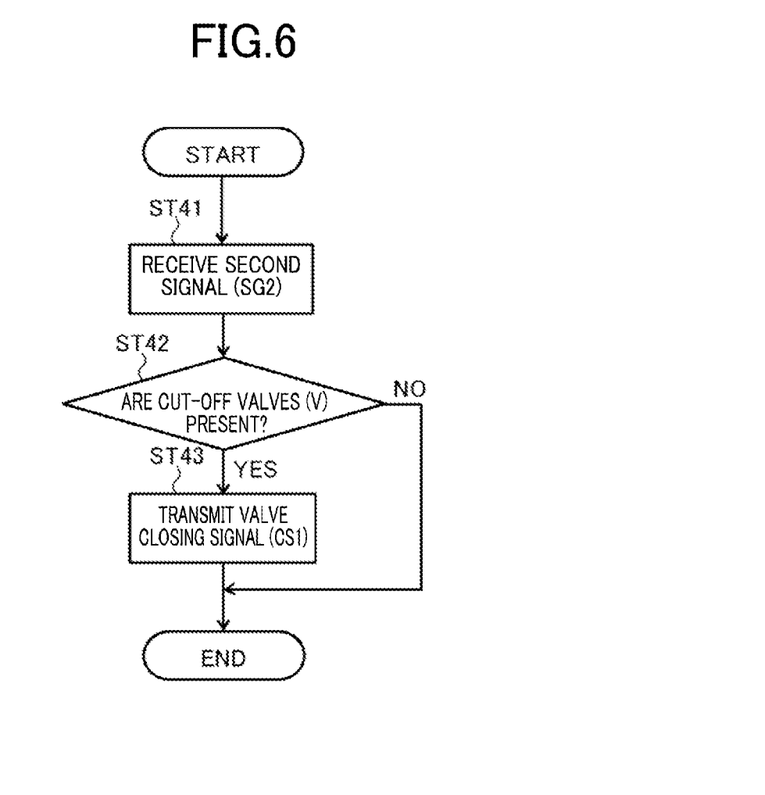
FIG. 6 is a flowchart for explaining operations performed by the indoor controller in a second process according to the embodiment.

Next, the second process to be performed by the indoor controllers (33) will be described with reference to FIG. 6.

In Step (ST41), the indoor controllers (33b, 33c) receive the second signal (SG2) transmitted by the outdoor controller (27) in Step (ST32).

In Step (ST42), the indoor controllers (33) each determine whether or not the valve controller (63) capable of communicating is present. Each indoor controller (33) determines whether or not the valve controller (63) capable of communicating is present, based on data stored in the semiconductor memory. If the indoor controller (33) determines that the valve controller (63) capable of communicating is present, Step (ST43) is performed. If the indoor controller (33) determines that no valve controller (63) capable of communicating is present, the process is terminated. In this embodiment, the valve controller (63b) capable of communicating with the indoor controller (33b) is present. Thus, Step (ST43) is performed. Since no valve controller (63) capable of communicating with the indoor controller (33c) is present, the process is terminated.

In Step (ST43), the indoor controller (33b) transmits the valve closing signal (CS1) to the associated valve controller (63b). Just like the valve controller (63a) illustrated in FIG. 4, the valve controller (63b) receiving the valve closing signal (CS1) closes the cut-off valves (Vb). In other words, the valve controller (63b), when receiving the valve closing signal (CS1), places the first and second cut-off valves (61b) and (62b) in the closed state. This blocks the liquid branch pipe (13) and the gas branch pipe (17), thus separating the indoor circuit (30a) of the indoor unit (30B) from the refrigerant circuit (10a).

As described above, if any one of the indoor controllers (33) of the air-conditioning system (1) of the embodiment detects leakage of the refrigerant, the cut-off valves (V) of all of the cut-off units (60) provided in the system are in the closed state. This can reduce the leakage of the refrigerant even if the sensors (70) do not correspond to the cut-off valves (V).

[Advantages of Embodiment]

As can be seen from the foregoing description, the outdoor controller (27), the indoor controllers (33), and the valve controllers (63) of the air-conditioning system (1) of the embodiment operate all of the cut-off valves (V) provided in the system if any of the indoor controllers (33) determines that the concentration of the refrigerant received from at least one of the plurality of sensors (70) as the plurality of detectors has exceeded the predetermined value.

In this embodiment, the outdoor controller (27) transmits the second signal (SG2) to each of the plurality of indoor controllers (33). The plurality of indoor controllers (33), when receiving the second signal (SG2), transmit the valve closing signal (CS1) to the associated valve controllers (63). The valve controllers (63), when receiving the valve closing signal (CS1), places the associated first cut-off valves (61) and the associated second cut-off valves (62) in the closed state. Thus, leakage of the refrigerant can be addressed even if the detectors (70) do not correspond to the cut-off valves (V) as the countermeasure devices (V, 65).

In the embodiment, each indoor controller (33), if the concentration of the refrigerant detected by the detector (70) provided in the indoor space (A) where the indoor controller (33) is located exceeds the predetermined value and the countermeasure devices (V, 65) capable of communicating with the indoor controller (33) are present, operates the countermeasure devices (V, 65) capable of communicating with the indoor controller (33), and transmits the first signal (SG1) to the outdoor controller (27). The outdoor controller (27), when receiving the first signal (SG1), makes all of the countermeasure devices (V, 65) except the countermeasure devices (V, 65) corresponding to the indoor controller (33) that has transmitted the first signal (SG1).

In this embodiment, if at least one of the concentrations of the refrigerant detected by the plurality of detectors (70) exceeds the predetermined value, the relay control unit (27) and the indoor controllers (33) operate all of the countermeasure devices (V, 65) provided in the system of this aspect. Thus, leakage of the refrigerant can be addressed even if the detectors (70) do not correspond to the countermeasure devices (V, 65).

Each indoor controller (33) operates the associated countermeasure devices (V, 65), not via the outdoor controller (27), if the countermeasure devices (V, 65) capable of communicating with the indoor controller (33) are present, and the concentration of the refrigerant detected by the associated detector (70) exceeds the predetermined value. This can quickly reduce leakage of the refrigerant.

In the embodiment, the outdoor controller (27), when receiving the first signal (SG1), transmits the second signal (SG2) to all of the indoor controllers (33) capable of communicating with the associated countermeasure devices (V, 65) except the indoor controller (33) that has transmitted the first signal (SG1). The indoor controllers (33), when receiving the second signal (SG2), operate the countermeasure devices (V, 65) capable of communicating with the indoor controllers (33).

In this embodiment, the outdoor controller (27), when receiving the first signal (SG1), does not transmit the second signal (SG1) to the indoor controller (33) that has transmitted the first signal (SG1). This can prevent malfunctions of the indoor controllers (33).

In this embodiment, each indoor controller (33) transmits the first signal (SG1) to the outdoor controller (27) if the concentration of the refrigerant detected by the detector (70) provided in the indoor space (A) where the indoor controller (33) is located exceeds the predetermined value and no countermeasure device (V, 65) capable of communicating with the indoor controller (33) is present.

In the embodiment, even if no countermeasure device (V, 65) capable of communicating with an indoor controller (33) is present, and the concentration of the refrigerant detected by the associated detector (70) exceeds the predetermined value, all of the countermeasure devices (V, 65) provided in the air-conditioning system (1) can be operated.

In the embodiment, the control unit (81) includes the outdoor controller (27) provided in the outdoor unit (20). If the concentrations of the refrigerant detected by the plurality of sensors (70) exceed the predetermined value, the outdoor controller (27) operates all of the cut-off valves (V) as the countermeasure devices (V, 65).

In the embodiment, if the concentrations of the refrigerant detected by the plurality of sensors (70) exceed the predetermined value, the outdoor controller (27) allows all of the cut-off valves (V) as the countermeasure devices (V, 65) to operate.

In the embodiment, the control unit (81) includes the plurality of indoor controllers (33) provided in the respective indoor units (30). Each indoor controller (33) transmits the first signal (SG1) to the outdoor controller (27) if the concentration of the refrigerant detected by the detector (70) provided in the indoor space (A) where the indoor controller (33) is located exceeds the predetermined value. The outdoor controller (27), when receiving the first signal (SG1), operates all of the cut-off valves (V) as the countermeasure devices (V, 65).

In the embodiment, direct communication between the outdoor controller (27) and the detectors (70) is not required.

In the embodiment, each indoor controller (33) is capable of communicating with the associated cut-off valves (V) as the countermeasure devices (V, 65) provided in correspondence with the indoor space (A) where the indoor controller (33) is located. The outdoor controller (27) receiving the first signal (SG1) transmits the second signal (SG2) to all of the indoor controllers (33) capable of communicating with the associated cut-off valves (V). The indoor controllers (33), when receiving the second signal (SG2), operate the cut-off valves (V) capable of communicating with the indoor controllers (33).

In the embodiment, direct communication between the outdoor controller (27) and the cut-off valves (V) is not required.

In the embodiment, the refrigerant circuit (10*a*) includes the indoor circuits (30*a*) each provided in the associated one of the indoor units (30), the liquid branch pipes (13) serving as the first refrigerant flow paths each connected to a liquid gas end portion of the associated one of the indoor circuits (30*a*), and the gas branch pipes (17) serving as the second refrigerant flow paths each connected to a gas liquid end portion of the associated one of the indoor circuits (30*a*). The countermeasure devices (V, 65) include the first cut-off valves (61) serving as the cut-off valves (V) each provided in the associated liquid branch pipe (13), and the second cut-off valves (62) serving as the cut-off valves (V) each provided in the associated gas branch pipe (17).

In the embodiment, the first cut-off valves (61) and the second cut-off valves (62) can reduce leakage of the refrigerant from the refrigerant circuit (10*a*) into the associated indoor spaces (A).

(Variations of Embodiment)

Figure 7:
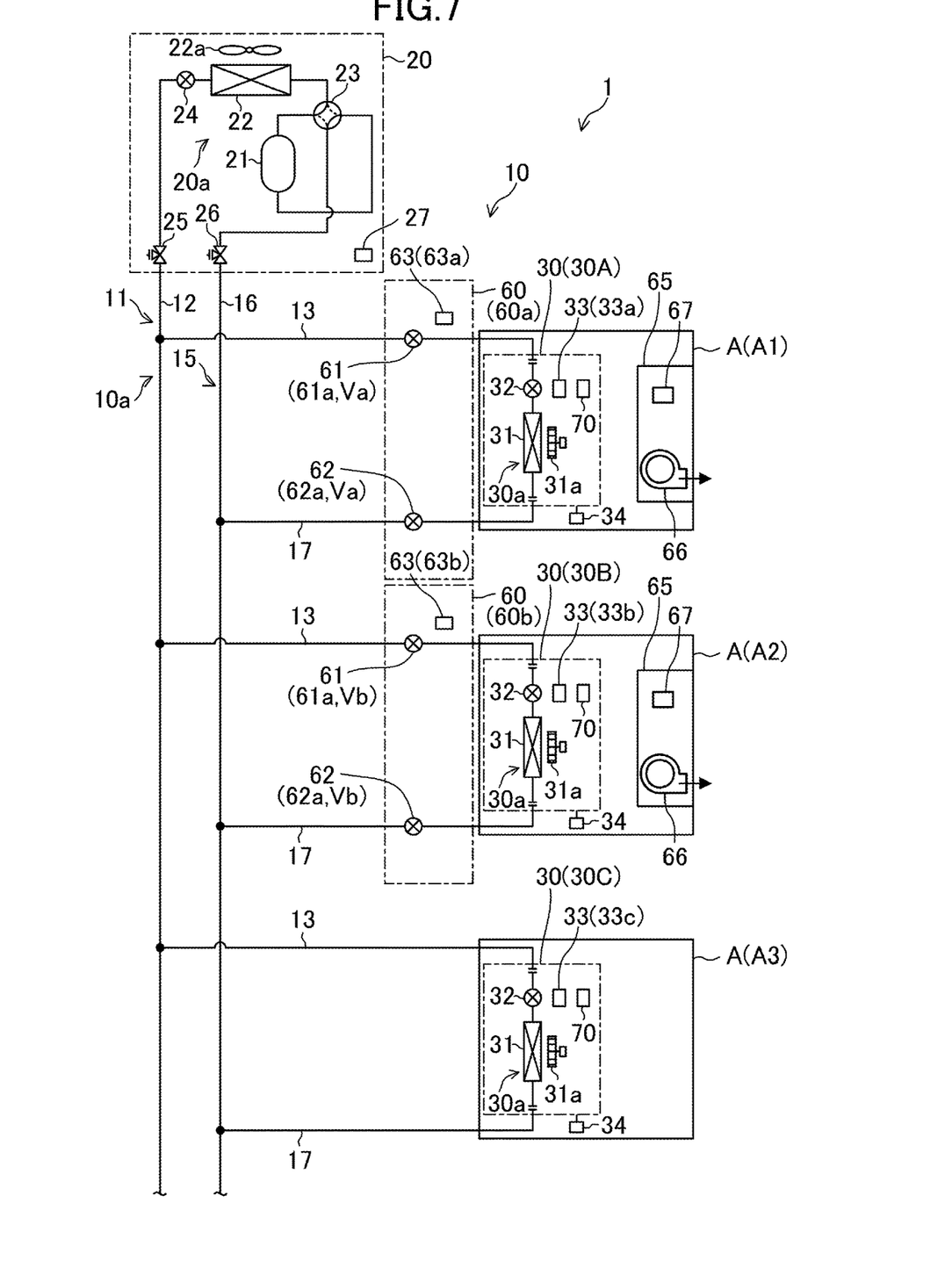
FIG. 7 is a piping system diagram illustrating a configuration of an air-conditioning system according to a variation of the embodiment.
Figure 8:
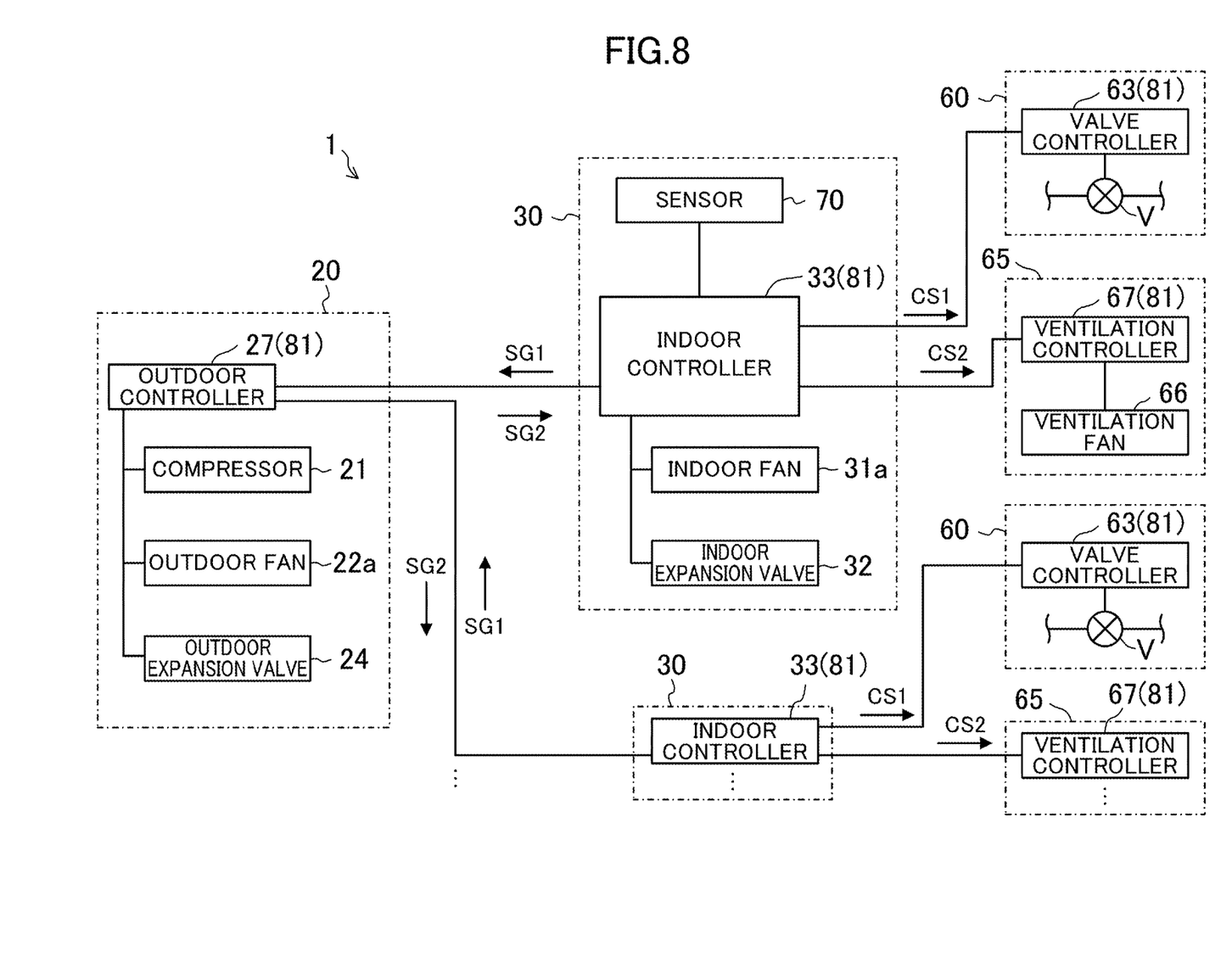
FIG. 8 is a block diagram illustrating a configuration of the air-conditioning system according to the variation of the embodiment.

As shown in FIGS. 7 and 8, the air-conditioning system (1) of the embodiment described above may include a plurality of ventilators (65). In this variation, the cut-off valves (V) and the ventilators (65) correspond to countermeasure devices. The plurality of ventilators (65) are each provided in correspondence with an indoor space (A). In FIG. 7, each of indoor spaces (A1, A2) is provided with one of the ventilators (65). Note that in FIG. 7, an indoor space (A3) is not provided with a ventilator (65). The number of the ventilators (65) is two in FIG. 7, but merely needs to be one or more.

Each of the plurality of ventilators (65) includes a ventilation fan (66) and a ventilation controller (67). The ventilation fan (66) is configured as, for example, a sirocco fan. The ventilation fan (66) performs a ventilating operation of discharging air in the indoor space (A) where the ventilation fan (66) is installed to an outdoor space, under an operation command from the ventilation controller (67). In the ventilating operation, while the air in the indoor space is discharged to the outdoor space, air in the outdoor space may be supplied into the indoor space.

Each ventilation controller (67) controls components including the ventilation fan (66). The ventilation controller (67) includes a microcomputer mounted on a control board, and a memory device (specifically, a semiconductor memory) storing software for operating the microcomputer.

Each ventilation controller (67) is connected to an indoor controller (33) of the associated one of indoor units (30) by a communication line. The ventilation controller (67) communicates with the indoor controller (33) via the communication line. The ventilation controller (67) controls the ventilation fan (66) to perform the ventilating operation in response to a signal from the indoor controller (33).

Figure 9:
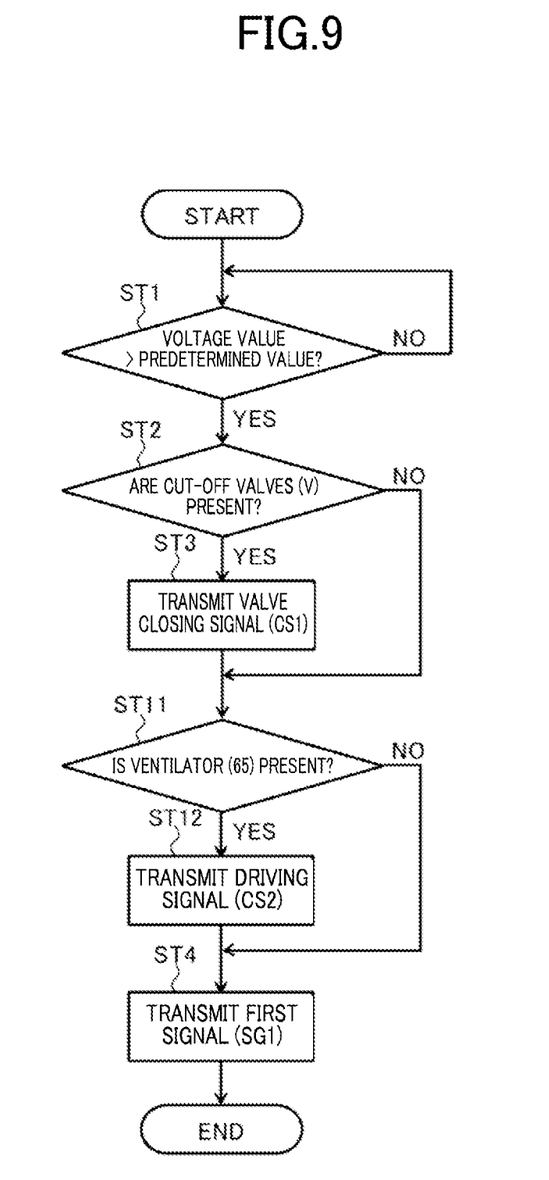
FIG. 9 is a flowchart for explaining operations performed by an indoor controller in a first process according to the variation of the embodiment.
Figure 10:
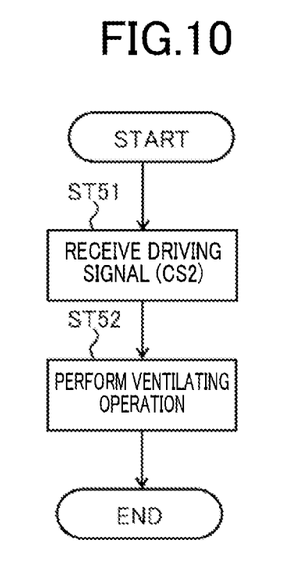
FIG. 10 is a flowchart for explaining operations performed by a ventilator according to the variation of the embodiment.
Figure 11:
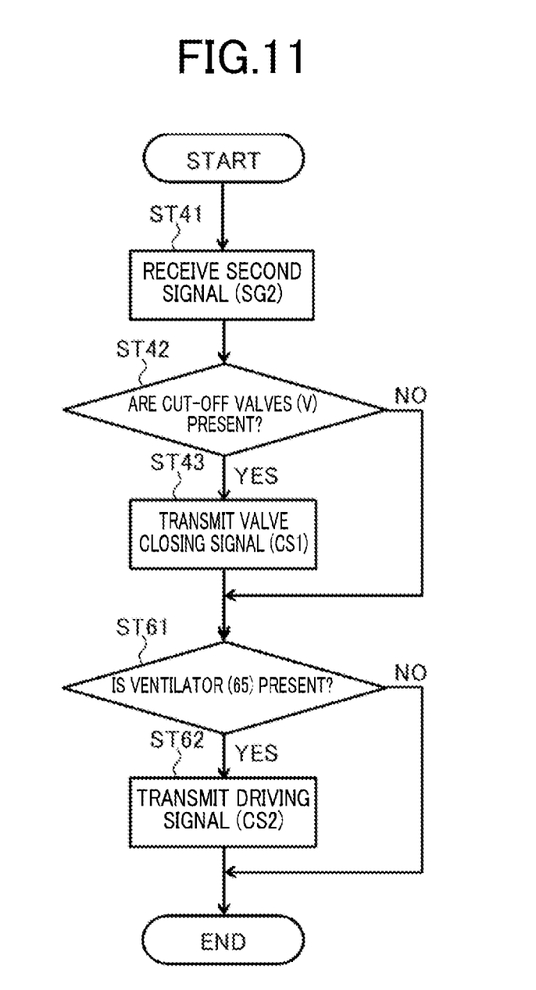
FIG. 11 is a flowchart for explaining operations performed by the indoor controller in a second process according to the variation of the embodiment.

The air-conditioning system (1) of this variation performs an operation similar to that of the air-conditioning system (1) of the embodiment illustrated in FIGS. 3 to 6 during leakage of the refrigerant. The following description with reference to FIGS. 9 to 11 will be focused on differences from the operation of the air-conditioning system (1) of the embodiment. In FIGS. 9 to 11, the same reference characters are used for the same steps as those in FIGS. 3 to 6.

The first process to be performed by each indoor controller (33) of the variation will be described with reference to FIG. 9.

As shown in FIG. 9, if the indoor controller (33) determines that the concentration of the refrigerant received from the sensor (70) has exceeded a predetermined value ("Yes" in Step (ST1)), and the associated cut-off valves (V) are present ("Yes" in Step (ST2)), the indoor controller (33) transmits a valve closing signal (CS1) to the associated valve controller (63) in Step (ST3).

In Step (ST11), the indoor controller (33) determines whether or not the ventilator (65) capable of communicating is present. The indoor controller (33) stores, in its semiconductor memory, whether or not the ventilation controller (67) capable of communicating is present. If the indoor controller (33) determines that the ventilator (65) is present, Step (ST12) is performed. If the indoor controller (33) determines that the ventilator (65) is not present, Step (ST12) is skipped, and Step (ST4) is performed.

In Step (ST12), the indoor controller (33) transmits a driving signal (CS2) to the ventilation controller (67).

Next, operation of each ventilator (65) will be described with reference to FIG. 10.

In Step (ST51), the ventilation controller (67) of the ventilator (65) receives the driving signal (CS2) transmitted by the indoor controller (33) in Step (ST12). In Step (ST52), the ventilation controller (67) makes the ventilation fan (66) perform the ventilating operation. Thus, the refrigerant that has leaked to the indoor space (A) is discharged to the outdoor space.

Next, the second process to be performed by each indoor controller (33) of the variation will be described with reference to FIG. 11.

As shown in FIG. 11, if the indoor controller (33) receives the second signal (SG2) from the outdoor controller (27) (Step (ST41)), and the associated cut-off valves (V) are present ("Yes" in Step (ST42)), the indoor controller (33) transmits the valve closing signal (CS1) to the associated valve controller (63) in Step (ST43).

In Step (ST61), the indoor controller (33) determines whether or not the ventilator (65) capable of communicating is present. The indoor controller (33) stores, in its semiconductor memory, whether or not the ventilation controller (67) capable of communicating is present. If the indoor controller (33) determines that the ventilator (65) is present, Step (ST62) is performed. If the indoor controller (33) determines that no ventilator (65) is present, the process is terminated.

In Step (ST62), the indoor controller (33) transmits the driving signal (CS2) to the ventilation controller (67).

The valve controllers (63), when receiving the valve closing signal (CS1), places the associated first cut-off valves (61) and the associated second cut-off valves (62) in the closed state. This blocks the liquid branch pipe (13) and the gas branch pipe (17). As a result, the indoor circuit (30a) of the indoor unit (30) is separated from the refrigerant circuit (10a). Thus, leakage of the refrigerant can be reduced even if the sensors (70) as the detectors do not correspond to the cut-off valves (V) as the countermeasure devices (V, 65).

The ventilation controller (67) that receives the driving signal (CS2) makes the ventilation fan (66) perform a ventilating operation. As a result, the refrigerant that has leaked to the indoor spaces (A1, A2) is discharged to the outdoor space. In other words, the operation of the ventilation fan (66) can reduce the concentration of the refrigerant in the associated indoor space (A). Thus, leakage of the refrigerant can be addressed even if the sensors (70) as the detectors (70) do not correspond to the ventilators (65) as the countermeasure devices (V, 65).

In this variation, the indoor controller (33) may transmit only the driving signal (CS2) to the ventilation controller (67) if the concentration of the refrigerant detected by the associated sensor (70) exceeds a predetermined value. Alternatively, the indoor controller (33) receiving the second signal (SG2) from the outdoor controller (27) may transmit only the driving signal (CS2) to the ventilation controller (67). In other words, in this variation, the indoor controller (33) may operate only the associated ventilator (65).

In this variation, the air-conditioning system (1) may include only the ventilators (65) out of the cut-off units (60) and the ventilators (65).

In this variation, even if the air-conditioning system (1) includes a plurality of ventilators (65), it may perform processes similar to those in FIGS. 3 to 6.

(Other Embodiments)

In the foregoing description, the sensor (70) is provided in each of the indoor units (30), but does not have to be provided in the indoor unit (30). Each of the sensors (70) may be provided in the associated remote control (34).

Each of the valve controllers (63) may be provided in the associated indoor controller (33). Each of the ventilation controllers (67) may be provided in the associated indoor controller (33).

The indoor units (30) may be ceiling mounted type units, wall-hanging type units, floor standing type units, or any other unit.

Communication between each indoor controller (33) and the associated valve controller (63) may be either wired or wireless, and communication between the indoor controller (33) and the associated ventilation controller (67) may be either wired or wireless.

The cut-off units (60) may each include only either the first cut-off valve (61) or the second cut-off valve (62).

The cut-off unit (60) and the ventilator (65) as the countermeasure devices (V, 65) do not have to be provided in correspondence with each of the plurality of indoor spaces (A). Either the cut-off unit (60) or the ventilator (65) merely needs to be provided in any one of the indoor spaces (A).

One remote control (34) may be provided for a plurality of indoor units (30). In this case, the remote control (34) may have some of the functions of the outdoor controller (27). In other words, the remote control (34) may correspond to the relay control unit.

The air-conditioning system (1) may include a central control unit configured to control operations (such as settings of the operating mode and temperature) of the outdoor controller (27) and the indoor controllers (33). In this case, the central control unit may have some of the functions of the outdoor controller (27). In other words, the central control unit may correspond to the relay control unit.

(Refrigerant)

The refrigerants used in the refrigerant circuit (10a) of the air conditioner (10) of the embodiment and the variations are flammable refrigerants. The flammable refrigerant includes refrigerants falling under Class 3 (highly flammable), Class 2 (less flammable), and Subclass 2L (mildly flammable) in the standards of ASHRAE34 Designation and safety classification of refrigerant in the United States or the standards of ISO817 Refrigerants-Designation and safety classification. FIG. 12 shows specific examples of the refrigerants used in the embodiments and the variations. In FIG. 12, "ASHRAE Number" indicates the ASHRAE number of each refrigerant defined in ISO 817, "Component" indicates the ASHRAE number of each substance contained in the refrigerant, "mass %" indicates the concentration of each substance contained in the refrigerant by mass %, and "Alternative" indicates the name of an alternative to the substance of the refrigerant which is often replaced by the alternative. The refrigerant used in the present embodiment is R32. The examples of the refrigerants shown in FIG. 12 are characterized by having a higher density than air.

While the embodiments and the variations thereof have been described above, it will be understood that various changes in form and details may be made without departing from the spirit and scope of the claims. The embodiment and the variations thereof may be combined and replaced with each other without deteriorating intended functions of the present disclosure.

INDUSTRIAL APPLICABILITY

As can be seen from the foregoing description, the present disclosure is useful for an air-conditioning system including an air conditioner.

EXPLANATION OF REFERENCES

1 Air-conditioning System
10 Air Conditioner
10a Refrigerant Circuit
13 Liquid Branch Pipe
17 Gas Branch Pipe
20 Outdoor Unit
20a Outdoor Circuit
27 Outdoor Controller
30 Indoor Unit
30a Indoor Circuit
33 Indoor Controller
60 Cut-Off Unit
61 First Cut-Off Valve
62 Second Cut-Off Valve
63 Valve Controller
65 Ventilator
66 Ventilation Controller
67 Ventilation Fan
70 Sensor
81 Control Unit V Cut-Off Valve

The invention claimed is:

1. An air-conditioning system, comprising:
an air conditioner including a refrigerant circuit formed by connecting an outdoor unit and a plurality of indoor units together, the air conditioner being configured to condition air in a plurality of indoor spaces;
at least one countermeasure device in a plurality of countermeasure devices provided in correspondence with at least one of the plurality of indoor spaces and configured to operate during leakage of a refrigerant;
a plurality of sensors configured to detect a concentration of the refrigerant, at least one of the sensors being provided in each of the plurality of indoor spaces; and
a controller configured to operate all of the at least one countermeasure device if at least one of the concentrations of the refrigerant respectively detected by the plurality of sensors exceeds a predetermined value, wherein
the refrigerant circuit includes indoor circuits each provided in an associated one of the indoor units, first refrigerant flow paths each connected to a liquid end portion of an associated one of the indoor circuits, and second refrigerant flow paths each connected to a gas end portion of an associated one of the indoor circuits,
the at least one countermeasure device is at least one of
a cut-off valve provided in one or each of the associated first and second refrigerant flow paths, or
a ventilator configured to ventilate an associated one of the indoor spaces,
the controller includes a relay controller, and a plurality of indoor controllers each provided in an associated one of the indoor units,
at least one of the indoor controllers is capable of communicating with the at least one countermeasure device,
each indoor controller, if the concentration of the refrigerant detected by the sensor provided in the indoor space where the indoor controller is located exceeds the predetermined value and the at least one countermeasure device capable of communicating with the indoor controller is present, operates the at least one countermeasure device capable of communicating with the indoor controller, and transmits a first signal to the relay control unit controller, and
the relay controller, when receiving the first signal, operates all of the countermeasure devices except the at least one countermeasure device corresponding to the indoor controller that has transmitted the first signal.

2. The air-conditioning system of claim 1, wherein
the relay controller, when receiving the first signal, transmits a second signal to all of the indoor controllers capable of communicating with the countermeasure devices except the indoor controller that has transmitted the first signal, and
for each of the indoor controllers other than the indoor controller that has transmitted the first signal, when receiving the second signal, operates the at least one countermeasure device capable of communicating.

3. The air-conditioning system of claim 1, wherein
the indoor controller transmits the first signal to the relay control unit if the concentration of the refrigerant detected by the detector provided in the indoor space where the indoor controller is located exceeds the predetermined value and no countermeasure device capable of communicating with the indoor controller is present.

4. The air-conditioning system of claim 2, wherein
the indoor controller transmits the first signal to the relay control unit if the concentration of the refrigerant detected by the detector provided in the indoor space where the indoor controller is located exceeds the predetermined value and no countermeasure device capable of communicating with the indoor controller is present.

* * * * *